US007308287B2

(12) United States Patent
Vaidyanathan

(10) Patent No.: US 7,308,287 B2
(45) Date of Patent: *Dec. 11, 2007

(54) COMPENSATION TECHNIQUES FOR GROUP DELAY EFFECTS IN TRANSMIT BEAMFORMING RADIO COMMUNICATION

(75) Inventor: Chandra Vaidyanathan, Bethesda, MD (US)

(73) Assignee: IPR Licensing Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/487,242

(22) Filed: Jul. 14, 2006

(65) Prior Publication Data

US 2006/0258403 A1    Nov. 16, 2006

Related U.S. Application Data

(63) Continuation of application No. 10/779,269, filed on Feb. 13, 2004, now Pat. No. 7,079,870.

(60) Provisional application No. 60/511,530, filed on Oct. 15, 2003, provisional application No. 60/476,982, filed on Jun. 9, 2003.

(51) Int. Cl.
*H04M 1/00* (2006.01)

(52) U.S. Cl. .................... 455/562.1; 455/63.4; 455/65; 455/561; 375/267; 375/299; 375/347

(58) Field of Classification Search ............... 455/63.1, 455/63.4, 65, 67.13, 114.2, 276.1, 561, 562.1; 370/329; 375/267, 299, 347
See application file for complete search history.

(56) References Cited

U.S. PATENT DOCUMENTS 4,599,734 A    7/1986    Yamamoto 4,639,914 A    1/1987    Winters
5,274,844 A    12/1993   Harrison et al.

(Continued)

FOREIGN PATENT DOCUMENTS

WO    WO 02/03568    1/2002

(Continued)

OTHER PUBLICATIONS

Iserte, Antonio Pascual et al., "Pre-and Post-Beamforming in MIMO Channels Applied to HIPERLAN/2 and OFDM," IST Summit 2001 (IST Mobile Communications Summit), Sep. 2001.

(Continued)

*Primary Examiner*—Edward F. Urban
*Assistant Examiner*—Raymond S. Dean
(74) *Attorney, Agent, or Firm*—Volpe and Koenig, P.C.

(57) ABSTRACT

In a wireless communication device, transmit weights are iteratively processed to compensate for any group delay caused by receive synchronization in the receive device. A transmit matrix of weights is computed from signals transmitted by a second communication device and received at a plurality of antennas of the first communication device. The transmit matrix processing includes normalizing a transmit weight vector with respect to a mode of the transmit weight associated with one of the plurality of antennas. The processed transmit matrix is then applied to a transmit signal to produce a plurality of transmit signals to be simultaneously transmitted from corresponding ones of the plurality of antennas of the first communication device. A plurality of eigenmodes is transmitted accordingly between the two devices in a converging iteration.

17 Claims, 7 Drawing Sheets

U.S. PATENT DOCUMENTS

| | | | |
|---|---|---|---|
| 5,394,435 | A | 2/1995 | Weerackody |
| 5,437,055 | A | 7/1995 | Wheatley, III |
| 5,491,723 | A | 2/1996 | Diepstraten |
| 5,507,035 | A | 4/1996 | Bantz et al. |
| 5,577,265 | A | 11/1996 | Wheatley, III |
| 5,610,617 | A | 3/1997 | Gans et al. |
| 5,982,327 | A | 11/1999 | Vook et al. |
| 6,008,760 | A | 12/1999 | Shattil |
| 6,037,898 | A | 3/2000 | Parish et al. |
| 6,038,272 | A | 3/2000 | Golden et al. |
| 6,044,120 | A | 3/2000 | Bar-David et al. |
| 6,058,105 | A | 5/2000 | Hochwald et al. |
| 6,097,771 | A | 8/2000 | Foschini |
| 6,122,260 | A | 9/2000 | Liu et al. |
| 6,124,824 | A | 9/2000 | Xu et al. |
| 6,141,393 | A | 10/2000 | Thomas et al. |
| 6,144,711 | A | 11/2000 | Raleigh et al. |
| 6,147,985 | A | 11/2000 | Bar-David et al. |
| 6,157,340 | A | 12/2000 | Xu et al. |
| 6,177,906 | B1 | 1/2001 | Petrus |
| 6,195,045 | B1 | 2/2001 | Xu et al. |
| 6,211,671 | B1 | 4/2001 | Shattil |
| 6,252,548 | B1 | 6/2001 | Jeon |
| 6,298,092 | B1 | 10/2001 | Heath, Jr. |
| 6,307,882 | B1 | 10/2001 | Marzetta |
| 6,317,466 | B1 | 11/2001 | Foschini et al. |
| 6,327,310 | B1 | 12/2001 | Hochwald et al. |
| 6,331,837 | B1 | 12/2001 | Shattil |
| 6,349,219 | B1 | 2/2002 | Hochwald et al. |
| 6,351,499 | B1 | 2/2002 | Paulraj et al. |
| 6,362,781 | B1 | 3/2002 | Thomas et al. |
| 6,369,757 | B1 * | 4/2002 | Song et al. ............... 342/378 |
| 6,369,758 | B1 | 4/2002 | Zhang |
| 6,370,182 | B2 | 4/2002 | Bierly et al. |
| 6,377,631 | B1 | 4/2002 | Raleigh |
| 6,377,636 | B1 | 4/2002 | Paulraj et al. |
| 6,377,819 | B1 | 4/2002 | Gesbert et al. |
| 6,400,699 | B1 | 6/2002 | Airy et al. |
| 6,400,780 | B1 | 6/2002 | Rashid-Farrokhi et al. |
| 6,442,214 | B1 | 8/2002 | Boleskei et al. |
| 6,462,709 | B1 | 10/2002 | Choi |
| 6,463,295 | B1 | 10/2002 | Yun |
| 6,473,467 | B1 | 10/2002 | Wallace et al. |
| 6,584,161 | B2 | 6/2003 | Hottinen et al. |
| 6,636,568 | B2 | 10/2003 | Kadous |
| 6,687,492 | B1 | 2/2004 | Sugar et al. |
| 7,079,870 | B2 * | 7/2006 | Vaidyanathan ........... 455/562.1 |
| 2001/0012764 | A1 | 8/2001 | Edwards et al. |
| 2001/0015994 | A1 | 8/2001 | Nam |
| 2001/0046255 | A1 | 11/2001 | Shattil |
| 2001/0053143 | A1 | 12/2001 | Li et al. |
| 2002/0001316 | A1 | 1/2002 | Homsby et al. |
| 2002/0024975 | A1 | 2/2002 | Hendler |
| 2002/0034191 | A1 | 3/2002 | Shattil |
| 2002/0039884 | A1 | 4/2002 | Raynes et al. |
| 2002/0064246 | A1 | 5/2002 | Kelkar et al. |
| 2002/0067309 | A1 | 6/2002 | Baker et al. |
| 2002/0072392 | A1 | 6/2002 | Awater et al. |
| 2002/0085643 | A1 | 7/2002 | Kitchener et al. |
| 2002/0102950 | A1 | 8/2002 | Gore et al. |
| 2002/0111142 | A1 | 8/2002 | Klimovitch |
| 2002/0118781 | A1 | 8/2002 | Thomas et al. |
| 2002/0122383 | A1 | 9/2002 | Wu et al. |
| 2002/0122501 | A1 | 9/2002 | Awater et al. |
| 2002/0127978 | A1 | 9/2002 | Khatri |
| 2002/0136170 | A1 | 9/2002 | Struhsaker |
| 2002/0141355 | A1 | 10/2002 | Struhsaker et al. |
| 2002/0155818 | A1 * | 10/2002 | Boros et al. ............... 455/67.4 |
| 2002/0158801 | A1 | 10/2002 | Crilly, Jr. et al. |
| 2002/0159537 | A1 | 10/2002 | Crilly, Jr. |
| 2002/0172269 | A1 | 11/2002 | Xu |
| 2002/0196842 | A1 | 12/2002 | Onggosanusi et al. |
| 2003/0002450 | A1 | 1/2003 | Jalali et al. |
| 2003/0032423 | A1 | 2/2003 | Boros et al. |
| 2003/0108117 | A1 | 6/2003 | Ketchum et al. |
| 2003/0125090 | A1 | 7/2003 | Zeira |
| 2003/0139194 | A1 | 7/2003 | Onggosanusi et al. |
| 2004/0072546 | A1 | 4/2004 | Sugar et al. |
| 2005/0094598 | A1 | 5/2005 | Medvedev et al. |

FOREIGN PATENT DOCUMENTS

| | | |
|---|---|---|
| WO | WO 01/45300 | 6/2002 |

OTHER PUBLICATIONS

Iserte, Antonio Pascual et al., "Joint Beamforming Strategies in OFDM-MIMO Systems," ICASSP 2002 (IEEE International Conference on Acoustics, Speech and Signal Processing), May 2002.

Lee, Dennis et al., "Antenna Diversity for an OFDM System in a Fading Channel," Proceeding of IEEE MILCOM 1999, Nov. 1999, pp. 1104-1109.

Jakes, William C., "Microwave Mobile Communications," Copyright 1974, pp. 313-320 and 489-498.

Yeh, Y.S., "An Analysis of Adaptive Retransmission Arrays in a Fading Environment," The Bell System Technical Journal, Oct. 1970, pp. 1811-1825.

Morgan, Samuel P., "Interaction of Adaptive Antenna Arrays in an Arbitrary Environment," The Bell System Technical Journal, Jan. 1965, pp. 23-47.

Aziz, Abdul M.K. et al., "Indoor Throughput and Range Improvements using Standard Compliant AP Antenna Diversity in IEEE 802.11a and ETSI HIPERLAN/2," Vehicular Technology Conference, 2002, VTC 2001, Oct. 7-11, 2001, IEEE VTS 54$^{th}$, vol. 4, pp. 2294-2298.

Iserte, Antonio Pascual et al., "Iterative Algorithm for the Estimation of Distributed Sources Localization Parameters," SSP 2001 (11$^{th}$ IEEE Workshop on Statistical Signal Processing), Aug. 2001.

Valdyanathan et al., "The Role of Lossless Systems in Modern Digital Signal Processing: A Tutorial," IEEE Transactions on Education, vol. 32, Aug. 1989, pp. 181-197.

Raleigh et al., "Spatio-Temporal Coding for Wireless Communication," IEEE Transactions on Communications, vol. 46, No. 3, Mar. 1998, pp. 357-366.

Jungnickel et al., "Performance of a MIMO System with Overlay Pilots," IEEE GlobeCom 2001, pp. 594-598.

BLAST High-Level Overview, Lucent Technologies, Jul. 18, 2000.

Golden et al., "Detection Algorithm and Initial Laboratory Results Using V-BLAST Space-Time Communication Architecture," Electronic Letters, Jan. 7, 1999, vol. 35, No. 1.

Golden et al., "V-BLAST: A High Capacity Space-Time Architecture for the Rich-Scattering Wireless Channel," Bell Laboratories, Lucent Technologies, Proc. Int'l Symposium on Advanced Radio Technologies, Builder, CO, Sep. 10, 1998.

Wolniansky et al., "V-BLAST: An Architecture for Realizing Very High Data Rates Over the Rich-Scattering Wireless Channel," Proc. ISSSE-98, Pisa, Italy, Sep. 29, 1998.

Chizhik et al., "Keyholes, Correlations, and Capacities of Multielement Transmit and Receiver Antennas," IEEE Transactions on Wireless Communications, vol. 1, No. 2, Apr. 2002, pp. 361-368.

Junqiang et al., "Spatial Multiuser Access with MIMO Smart Antennas for OFDM Systems," IEEE VTC '2001, Sep. 2001, pp. 1553-1557.

Stridh et al., "MIMO Channel Capacity on a Measured Indoor Radio Channel at 5.8 GHz," Proc. Of the Asilomar Conf. on Signals, Systems & Computers, vol. 1, Oct. 2000, pp. 733-737.

Jungnickel et al., "A MIMO WLAN Based on Linear Channel Inversion," IEEE Seminar-MIMO Communication Systems from Concept to Implementation, Dec. 2001, pp. 20/1-20/6.

Stridh et al., "Spatial Characterization of Indoor Radio Channel Measurements at 5 GHz," SAM '2000, Mar. 2000, pp. 58-62.

Irner, Ralf et al., "MISO Concepts for Frequency-Selective Channels," 2002 International Zurich Seminar on Broadband Communications Access, Feb. 19-21, 2002.

Choi, Ruly Lai-U et al., "MISO CDMA Transmission with Simplified Receiver for Wireless Communication Handsets," IEEE Transactions on Communications, vol. 49, No. 5, May 2002.

Meyer-Ottens, Sven et al., "Downlink Beamforming for W-CDMA Using Feedback and Interference Estimate," Mar. 9, 2001.

Brunner, Christopher et al., "Downlink Beamforming for WCDMA Based on Uplink Channel Parameters," Proc. EPMCC 1999, pp. 375-380, Mar. 1999.

Yang, Jian et al., "On Joint Transmitter and Receive Optimization for Multiple-Input-Multiple-Output (MIMO) Transmission Systems," IEEE Transactions on Communications, vol. 42, No. 12, Dec. 1994.

Ivriac, Michel et al., "On Channel Capacity of Correlated MIMO Channels," ITG Fokusprojekt: Mobilkommunikation "Systeme mit Intelligenten Antennen", Ilmenau, 2001.

Bablan et al., "Optimum Diversity Combining and Equalization in Digital Data Transmission with Applications to Cellular Mobile Radio-PartII: Numerical Results", May 1992, IEEE Transactions on Communications, vol. 30, No. 5, pp. 895-907.

Chuah et al., "Capacity of Multi-Antenna Array Systems in Indoor Wireless Environment", Nov. 1998, IEEE Globecom.

Wallace et al., "Experimental Characterization of the MIMO Wireless Channel: Data Acquisition and Analysis", Feb. 27, 2002, Department of Electrical and Computer Engineering, Brigham Young University.

Love et al., "Equal Gain Transmission in Multiple-Input Multiple-Output Wireless Systems", Nov. 2002, Proceedings of IEEE Globecom, pp. 1124-1128.

Lucent Technologies, "Lucent Technologies' Chips Poised to Bring "BLAST" Multiple Input/Multiple Output Technology to Laptops, PDAs and Other Mobile Devices," Oct. 16, 2002, lucent.com.

"Lucent's "BLAST" chips to take off in wireless market", Oct. 16, 2002, Semiconductor Business News.

Heath et al., "A Simple Scheme for Transmit Diversity Using Partial Channel Feedback," 1998, IEEE.

Chiu, et al., "OFDM Receiver Design," EE225C, Fall 2000, University of California, Berkeley.

* cited by examiner

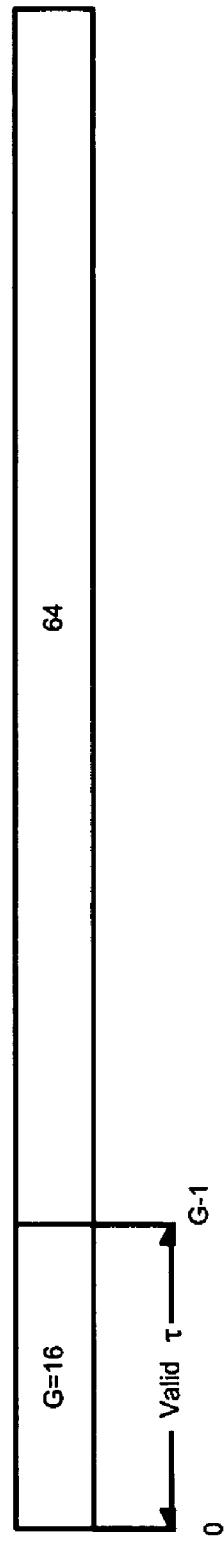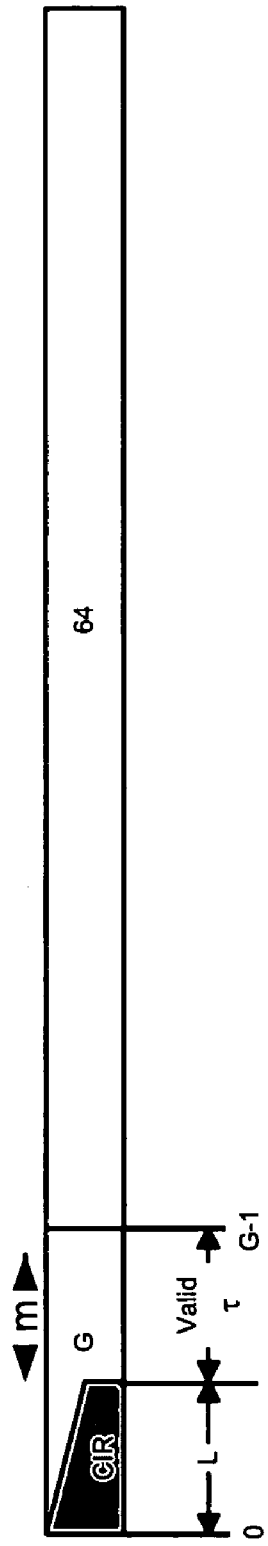
FIG. 3
OFDM symbol w/o delay spread
FIG. 4
OFDM symbol w/ L sample delay spread

COMPENSATION TECHNIQUES FOR GROUP DELAY EFFECTS IN TRANSMIT BEAMFORMING RADIO COMMUNICATION

CROSS REFERENCE TO RELATED APPLICATIONS

This application is a continuation of U.S. patent application Ser. No. 10/779,269, filed Feb. 13, 2004, now U.S. Pat. No. 7,079,870 which in turn claims priority from U.S. Provisional Application No. 60/476,982, filed Jun. 9, 2003; and U.S. Provisional Application No. 60/511,530, filed Oct. 15, 2003, which are incorporated by reference as if fully set forth.

FIELD OF THE INVENTION

The present invention relates to transmit beamforming radio communication techniques and more particularly to techniques for compensating for group delay effects associated with orthogonal frequency division multiplex (OFDM) communication signals.

BACKGROUND

Examples of transmit beamforming radio algorithms that compute and use transmit weights for transmitting signals to another device are disclosed in U.S. Pat. No. 6,687,492, issued Feb. 3, 2004 and entitled "System and Method for Antenna Diversity Using Joint Maximal Ratio Combining" and in U.S. patent application Ser. No. 10/174,689, filed Jun. 19, 2002. According to these algorithms, receive weights associated with signals transmitted by a second device and received at multiple antennas of a first device are used to compute transmit weights for transmitting signals to a second device. The receive weights will include a group delay term due to group delay ambiguities in the receive synchronization algorithm used in the device for synchronizing to OFDM signals. In order to maintain desired performance of the above-described transmit beamforming radio algorithms, these group delay effects need to be removed.

SUMMARY

A method and apparatus in a wireless communication between a first communication device and a second communication device compensates for a group delay effect introduced by a synchronization algorithm. A baseband signal processor of the second communication device computes a transmit matrix of antenna weights from signals received at the plurality of antennas of the first communication device representing a plurality of modes simultaneously transmitted by the second communication device, wherein the transmit matrix distributes a plurality of modes among a plurality of antenna paths associated with corresponding ones of the plurality of antennas of the first communication device. The baseband signal processor processes the transmit matrix to compensate for the group delay, said processing includes normalizing the transmit matrix with respect to a reference mode corresponding to one of the plurality of antennas of the first communication device. The baseband signal processor applies the transmit matrix to a plurality of modes to be simultaneously transmitted from corresponding ones of the plurality of antennas of the first communication device to the second communication device. This process is repeated by the second communication device, and then again by the first communication device in an iterative manner allowing the transmit matrix of weights to converge.

BRIEF DESCRIPTION OF THE DRAWINGS

FIG. 3 shows timing for an OFDM symbol generated without delay spread.

FIG. 4 shows timing for an OFDM symbol generated with L-sample delay spread.

DETAILED DESCRIPTION OF THE PREFERRED EMBODIMENTS

Figure 1:
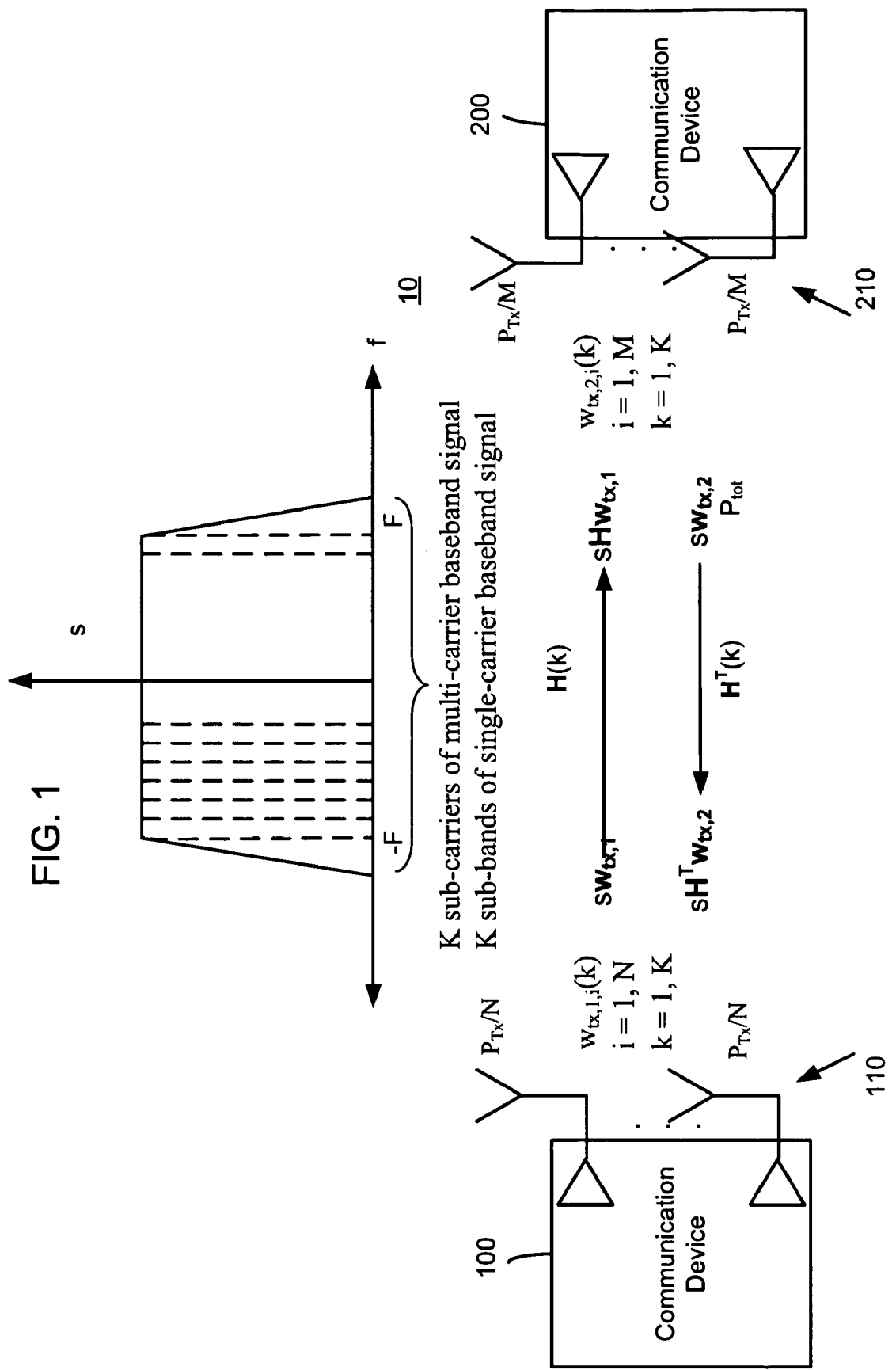
FIG. 1 is a diagram showing two devices that transmit beamform signals between each other.

FIG. 1 shows a system 10 is shown in which a first communication device and a second communication device 200 communicate with each other using radio frequency (RF) communication techniques. This system is described in greater detail in U.S. application Ser. No. 10/174,689 referred to above. The devices use composite beamforming techniques when communicating with each other. In particular, communication device 100 has N plurality of antennas 110 and communication device 200 has M plurality of antennas 210. According to the composite beamforming (CBF) technique also described in the aforementioned co-pending application, when communication device 100 transmits a signal to communication device 200, it applies to (i.e., multiplies or scales) a baseband signal s to be transmitted a transmit weight vector associated with a particular destination device, e.g., communication device 200, denoted $w_{tx,1}$. Similarly, when communication device 200 transmits a baseband signal s to communication device 100, it multiplies the baseband signal s by a transmit weight vector $w_{tx,2}$ associated with destination communication device 100. The (M×N) frequency dependent channel matrix from the N plurality of antennas of the first communication device 100 to M plurality of antennas of the second communication device 200 is H(k), where k is a frequency index or variable, and the frequency dependent communication channel (N×M) matrix between the M plurality of antennas of the second communication device and the N plurality of antennas of the first communication device is $H^T(k)$.

The transmit weight vectors $w_{tx,1}$ and $w_{tx,2}$ each comprises a plurality of transmit weights corresponding to each of the N and M antennas, respectively. Each transmit weight is a complex quantity. Moreover, each transmit weight vector is frequency dependent; it may vary across the bandwidth of the baseband signal s to be transmitted. For example, if the baseband signal s is a multi-carrier signal of K sub-carriers, each transmit weight for a corresponding antenna varies across the K sub-carriers. Similarly, if the baseband signal s is a single-carrier signal (that can be divided or synthesized into K frequency sub-bands), each transmit weight for a corresponding antenna varies across the bandwidth of the baseband signal. Therefore, the transmit weight vector is dependent on frequency, or varies with frequency sub-band/sub-carrier k, such that wtx becomes $w_{tx}(f)$, or more commonly referred to as $w_{tx}(k)$, where k is the frequency sub-band/sub-carrier index.

While the terms frequency sub-band/sub-carrier are used herein in connection with beamforming in a frequency dependent channel, it should be understood that the term "sub-band" is meant to include a narrow bandwidth of spectrum forming a part of a baseband signal. The sub-band may be a single discrete frequency (within a suitable frequency resolution that a device can process) or a narrow bandwidth of several frequencies.

The receiving communication device also weights the signals received at its antennas with a receive antenna weight vector $w_{rx}(k)$. Communication device 100 uses a receive antenna weight vector $w_{rx,1}(k)$ when receiving a transmission from communication device 200, and communication device 200 uses a receive antenna weight vector $w_{rx,2}(k)$ when receiving a transmission from communication device 100. The receive antenna weights of each vector are matched to the received signals by the receiving communication device. The receive weight vector may also be frequency dependent.

Generally, transmit weight vector $w_{tx,1}$ comprises a plurality of transmit antenna weights $w_{tx,1,i} = \beta_{1,i}(k)\exp(j\phi_{1,i}(k))$, where $\beta_{1,i}(k)$ is the magnitude of the antenna weight, $\phi_{1,i}(k)$ is the phase of the antenna weight, i is the antenna index, and k is the frequency sub-band or sub-carrier index (up to K frequency sub-bands/sub-carriers). The subscripts tx,1 denote that it is a vector that communication device 100 uses to transmit to communication device 200. Similarly, the subscripts tx,2 denote that it is a vector that communication device 200 uses to transmit to communication device 100.

Figure 2:
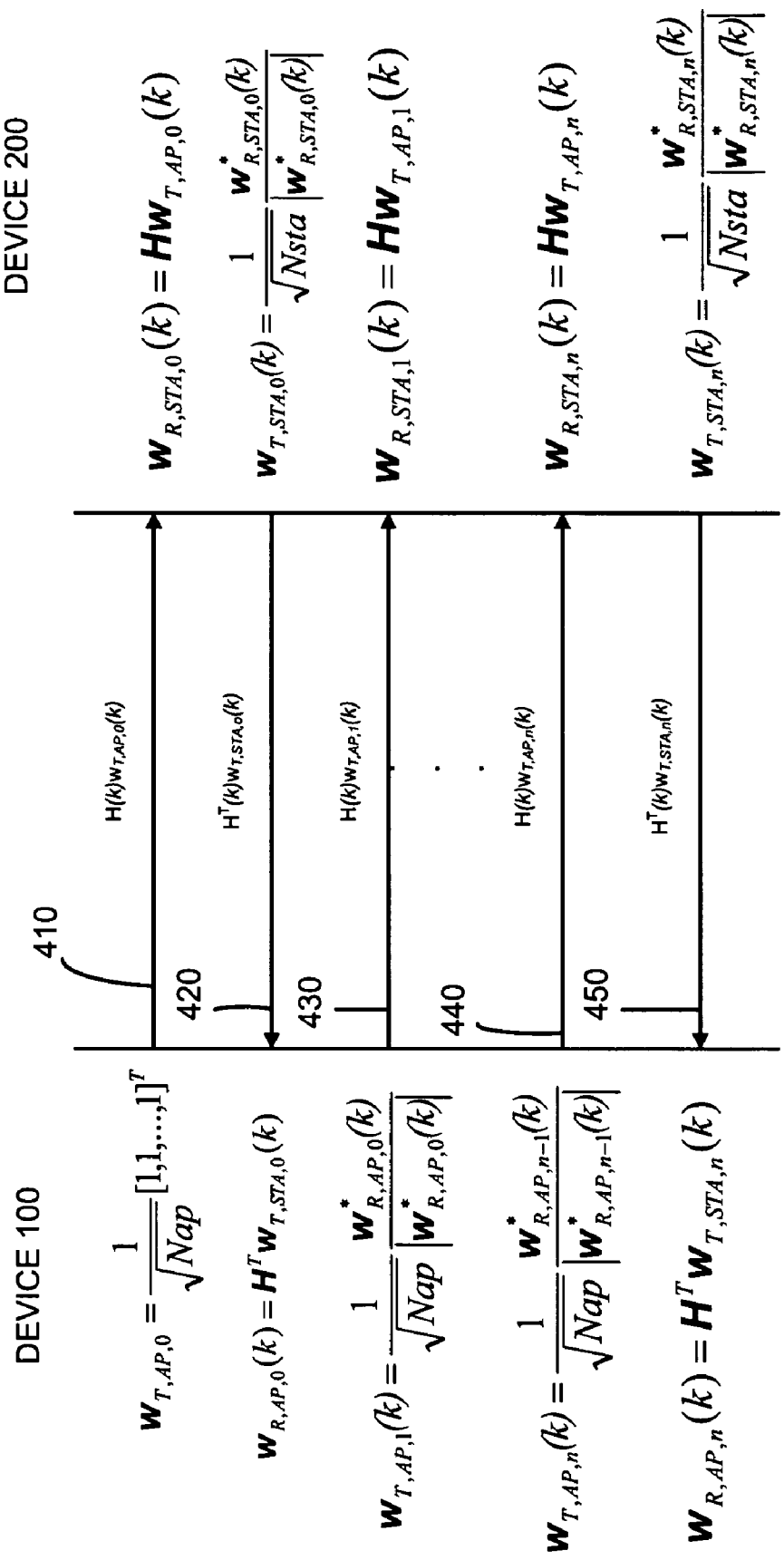
FIG. 2 is a flow chart of an algorithm by a device computes transmit weights based on received signals from the other device.

FIG. 2 shows a procedure 400 for determining near optimum transmit antenna weight vectors for first and second communication devices also described in detail in U.S. application Ser. No. 10/174,689 referred to above. The antenna weight parameters in FIG. 2 are written with subscripts to reflect communication between a WLAN access point (AP) and a station (STA) as examples of first and second communication devices, respectively. However, without loss of generality, it should be understood that this process is not limited to WLAN application. The AP has Nap antennas and the STA has Nsta antennas. Assuming the AP begins with a transmission to the STA, the initial AP transmit weight vector $w_{T,AP,0}(k)$ is [1,1, . . . 1], equal power normalized by $1/(Nap)^{1/2}$ for all antennas and all frequency sub-bands/sub-carriers k. Phase for the transmit antenna weights is also initially set to zero. The subscript T indicates it is a transmit weight vector, subscript AP indicates it is an AP vector, subscript 0 is the iteration of the vector, and (k) indicates that it is frequency sub-band/sub-carrier dependent. The transmit weight vectors identified in FIG. 5 form an N×K matrix explained above.

In step 410, a baseband signal is multiplied by the initial AP transmit weight vector $w_{T,AP,0}(k)$, upconverted and transmitted to the STA. The transmitted signal is altered by the frequency dependent channel matrix H(k) from AP-STA. The STA receives the signal and matches its initial receive weight vector $w_{R,STA,0}(k)$ to the signals received at its antennas. In step 420, the STA gain normalizes the receive weight vector $w_{R,STA,0}(k)$ and computes the conjugate of gain-normalized receive weight vector to generate the STA's initial transmit weights for transmitting a signal back to the AP. The STA multiplies the signal to be transmitted to the AP by the initial transmit weight vector, upconverts that signal and transmits it to the AP. Computing the conjugate for the gain-normalized vector means essentially co-phasing the receive weight vector (i.e., phase conjugating the receive weight vector). The transmitted signal is effectively scaled by the frequency dependent channel matrix $H^T(k)$. At the AP, the receive weight vector is matched to the signals received at its antennas. The AP then computes the conjugate of the gain-normalized receive weight vector as the next transmit weight vector $w_{T,AP,1}(k)$ and in step 430 transmits a signal to the STA using that transmit weight vector. The STA receives the signal transmitted from the AP with this next transmit weight vector and matches to the received signals to compute a next receive weight vector $w_{R,STA,1}(k)$. Again, the STA computes the conjugate of the gain-normalized receive weight vector $w_{R,STA,1}(k)$ as its next transmit weight vector $w_{T,STA,1}(k)$ for transmitting a signal back to the AP. This process repeats each time a first device receive signals from the second device to update the transmit weight vector it uses for transmitting back to the second device, and vice versa. This adaptive process works even if one of the devices, such as a STA, has a single antenna for transmission and reception.

FIG. 2 also shows the equal power constraint applied to the transmit weight vector, (divide by square root of the number of antennas (Nap or Nsta)), such that the power of the signals transmitted by each of the plurality of antennas of the first communication device is equal. When considering a frequency dependent communication channel, a frequency shaping constraint may also be applied. The frequency shaping constraint requires that the transmit weight vector is computed such that the sum of the power at each corresponding one of a plurality of frequency sub-carriers across the plurality of transmit signals is equal to a constant. This constraint is useful to ensure that, in an iterative process between two communication devices, the transmit weights of the two devices will converge. An additional benefit of this constraint is that the transmitting device can easily satisfy spectral mask requirements of a communication standard, such as IEEE 802.11x.

FIGS. 3 and 4 show the timing associated with a signal sent using OFDM techniques according to the IEEE 802.11a or 802.11g communication standards, for example. An OFDM symbol is generated by taking 64-point IFFTs of 64 sub-carriers. A cyclic prefix of 16 samples is added to the time domain signal to generate a symbol of 80 samples. Since the FFT is unchanged due to cyclic rotations, the receiver in a device can take the IFFT starting at any of the 16 locations in the prefix. The range of valid time offsets with and without delay spread is shown FIGS. 3 and 4.

In general, for a multi-carrier modulated signal, the channel transfer function for the k-th sub-carrier at the j-th antenna of the destination device (e.g., device 200) may be denoted $F_j(k)$. If the baseband receive synchronization algorithm used in the modem (baseband signal processor) at the receive device on the link selects sample (G-1), then the channel estimate (j-th antenna) is $F'_j(k)=F_j(k)$. However, if the receive synchronization algorithm selects any other point, then the channel estimate is $F'_j(k)=F_j(k)\exp(-j2\pi mk/N)$, where m is the group delay as shown in FIG. 4. This is due to the time-shift property of the FFT $f_j(n) \leftrightarrow F_j(k)$; $f_j(n+m) \leftrightarrow F_j(k)\exp(-j2\pi mk/N)$. T group delay will not affect receiver performance at the destination device 200 because the data symbols also have this phase term.

However, the transmit weights used by device 200 to transmit beamform back to device 100 have the same form $F_j(k)\exp(-j2\pi mk/N)$. The group delay term m can potentially cause problems with the synchronization algorithm at the device 100 since it will shift the valid set of time offsets by m. The receive synchronization algorithm at the device 100 could potentially select time offsets outside the valid range (denoted by τ).

One solution to correct for this is to normalize the transmit weights with respect to one antenna at that device since only the relative phase relationships between antennas is important. In this case, the weight for a first antenna, e.g., antenna 0, of a device is always 1.

Figure 5:
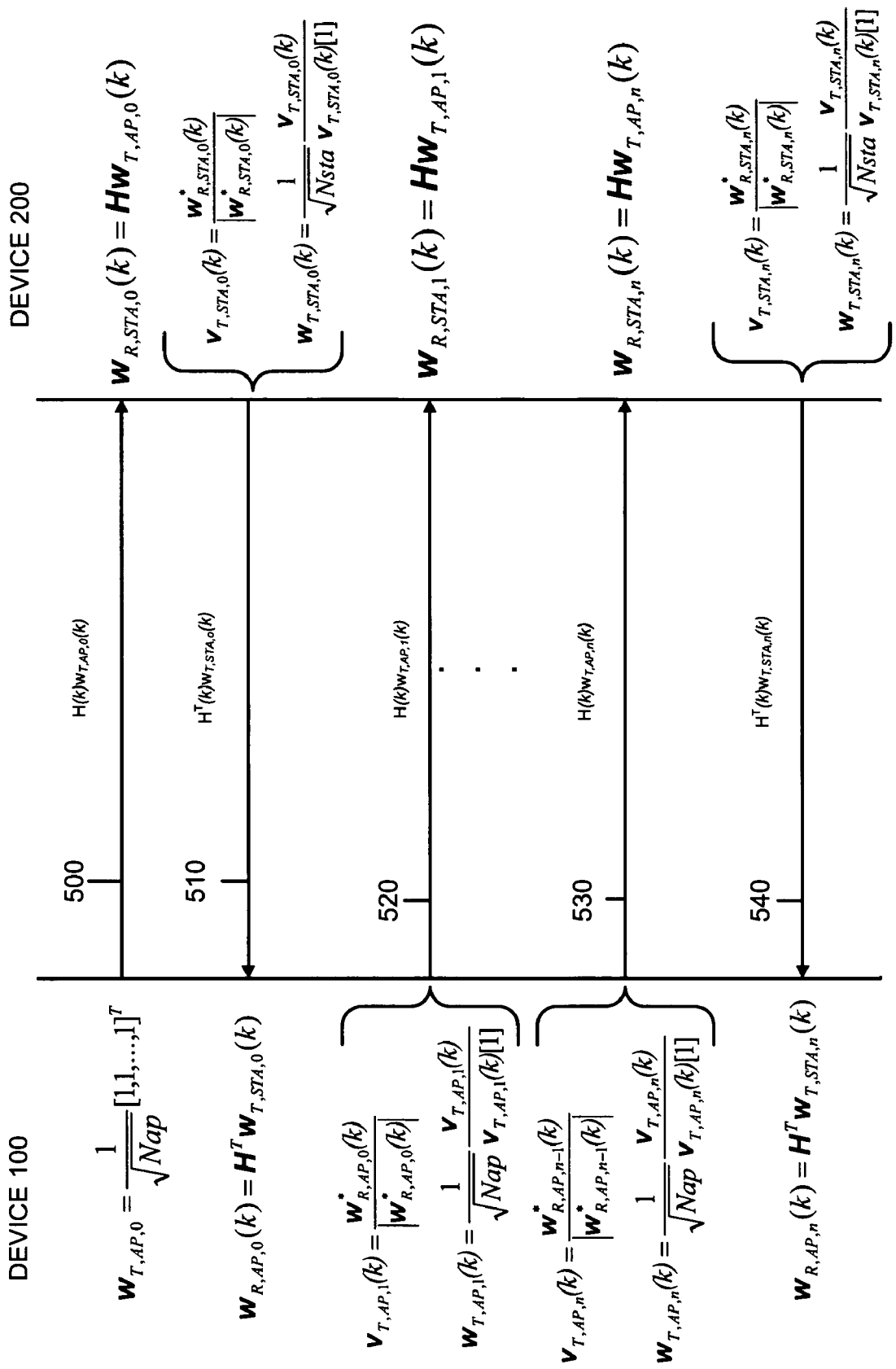
FIG. 5 is a flow chart of the algorithm of FIG. 2, modified to compensate for group delay effects.

The algorithm shown in FIG. 2 is modified as shown in FIG. 5, where when computing the transmit weight vector for transmitting a signal to another device, the transmit weight vector is normalized with respect to the weight or element of the transmit weight vector at one of the plurality of antennas, e.g., antenna 1. For example, in step 510, the device 200, e.g., an 802.11 station (STA), computes the intermediate vector $v_{T,STA,0}(k)$ by computing the conjugate of the receive weight vector $w_{R,STA,0}(k)$ divided by the norm of the conjugate of the receive weight vector $w_{R,STA,0}(k)$, i.e., $$v_{T,STA,0}(k) = \frac{w^*_{R,STA,0}(k)}{|w^*_{R,STA,0}(k)|}.$$

The received weight vector $w_{R,STA,0}(k)$ is formed by receive weights obtained by applying a matched filter to the signals received at the antennas of the second device. The transmit weight vector (comprised of transmit weights) is formed by dividing the intermediate vector by the value of the element of the intermediate vector v for antenna 1, denoted by $v_{T,STA,0}(k)[1]$, where the subscript $_{T,STA,0}$ denotes the transmit vector of the STA at iteration 0. Dividing by the value $v_{T,STA,0}(k)[1]$ effectively normalizes the transmit weight vector $w_{T,STA,0}(k)$ with respect to the weight for one of the antennas, e.g., antenna 1, which removes any group delay term that may have been present in and carried through from the receive weights. Similarly, in step 520, the first device 100, e.g., an 802.11 access point (AP), computes the intermediate vector $$V_{T,AP,0}(k) = \frac{w^*_{R,AP,0}(k)}{|w^*_{R,AP,0}(k)|}$$

from the received weight vector $w_{R,AP,0}(k)$. The value of the element of the intermediate vector v for antenna 1 is used in the denominator in computing the transmit weight vector $w_{T,AP,1}(k)$. The process continues as shown by steps 500-540 in FIG. 5 whereby each device updates its transmit weight vector as described above each time it receive signals from the other device. By normalizing the transmit weight vector by the value of the element of the transmit weight vector (e.g., weight) for a particular antenna, e.g., antenna 1, the transmit weight vector will not include a group delay term that would be carried through when applied to the transmit signal. The equal power and frequency shaping constraints referred to above may also be applied when computing the transmit weight vector.

To summarize, a method for radio communication between a first communication device and a second communication device is provided comprising steps of: computing transmit weights from signals transmitted by the second communication device and received at a plurality of antennas of the first communication device, wherein the step of computing comprises processing the transmit weights to compensate for group delay that may be introduced by receive synchronization performed by the first communication device; and applying the transmit weights to a transmit signal to produce a plurality of transmit signals to be simultaneously transmitted from corresponding ones of the plurality of antennas of the first communication device to the second communication device. The receive weights are computed from signals received at the plurality of antennas of the first communication device, and the transmit weights are computed by computing a transmit weight vector from a conjugate of a receive weight vector formed by the receive weights divided by a norm of the conjugate of the receive weight vector. The transmit weights are further processed to compensate (e.g., remove) group delay by normalizing the transmit weight vector with respect to an element of the transmit weight vector corresponding to one of the plurality of antennas of the first communication device. Said another way, the transmit weights are computed by computing an intermediate vector equal to a conjugate of a receive weight vector formed by the receive weights divided by the norm of the conjugate of the receive weight vector, and processing the intermediate vector by dividing the intermediate vector by an element of the intermediate vector corresponding to one of the plurality of antennas of the first communication device. The transmit weights (e.g., transmit weight vector) may be computed such that the power of the signals transmitted by each of the plurality of antennas of the first communication device is equal. Moreover, the transmit weights may be computed such that the sum of the power at each corresponding one of a plurality of frequency subcarriers across the plurality of transmit signals is equal to a constant. These steps are performed at the devices on both sides of the link such that when a first device receives signals from the second device and updates the transmit weights it uses for transmitting back to the second device, and vice versa.

Figure 6:
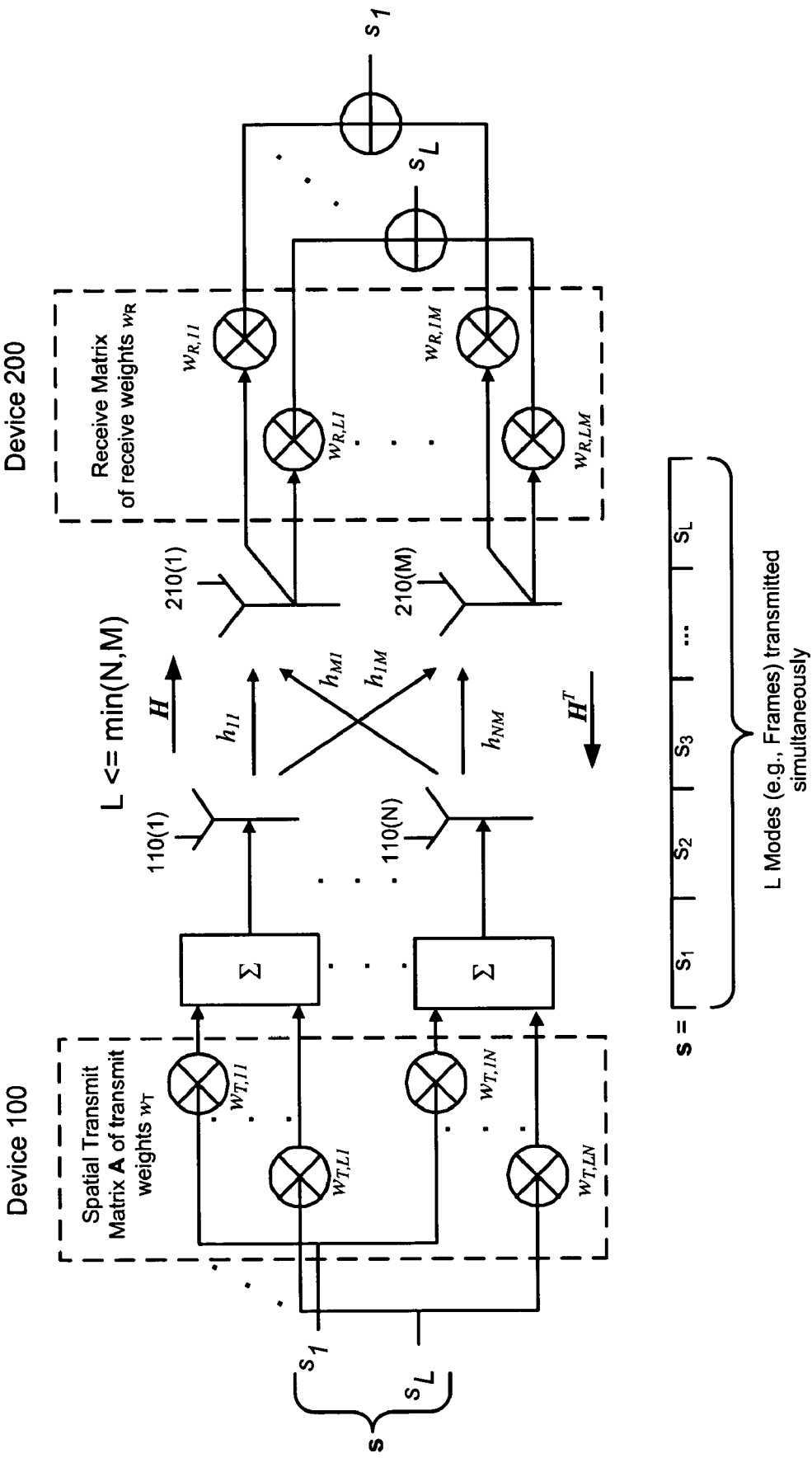
FIG. 6 is a block diagram of a vector beamforming system in which the group delay compensation techniques may be used.

The group delay compensation techniques described in conjunction with FIG. 5 can be extended to a vector transmit beamforming system shown in FIG. 6 in which a first radio communication device 100 having N antennas 110(1) to 110(N) communicates by a wireless radio link with a second communication device 200 having M antennas 210(1) to 210(M). In the explanation that follows, the first communication device transmits to the second communication device, but the same analysis applies to a transmission from the second communication device to the first. The channel response from the N antennas of the first communication device to the M antennas of the second communication device is described by the channel response matrix H. The channel matrix in the opposite direction is $H^T$.

Using vector beamforming techniques, device 100 will simultaneously transmit L eigenmodes (modes) $s_1, s_2, \ldots, s_L$ by antennas 110(1) to 110(N). A vector s is defined that represents the L modes $[s_1 \ldots s_L]$ (at baseband) to be transmitted such that $s=[s_1 \ldots s_L]^T$. The number (L) of modes that can be simultaneously transmitted depends on the channel H between device 100 and device 200, and in particular:

L≦Rank of $H^H H$≦min(N,M). For example, if N=4, and M=2, then L≦Rank of $H^H H$≦2. Each eigenmode is a signal or signal stream, such as a data stream, data block, data packet, data frame, etc.

Two matrices are introduced: V is the eigenvector matrix for $H^H H$ and $\Lambda$ is the eigenvalue matrix for $H^H H$. Device 100 transmits the product As, where the matrix A is the spatial multiplexing transmit matrix, where A=VD. The matrix $D=\text{diag}(d_1, \ldots, d_L)$ where $|d_p|^2$ is the transmit power in $p^{th}$ mode, or in other words, the power of the $p^{th}$ one of the L signals. Device 200 receives HAs+n, and after maximal ratio combining for each of the modes, device 200 computes $c = A^H H^H H A s + A^H H^H n = D^H D A s + D^H V^H H^H n$. The matrix A is shown below.

$$A = VD = W_T = \begin{bmatrix} w_{T,11} & w_{T,21} & \cdots & w_{T,L1} \\ w_{T,12} & & & \cdots \\ \cdots & & & \cdots \\ \cdots & & & \cdots \\ w_{T,1N} & \cdots & \cdots & w_{T,LN} \end{bmatrix}$$

The product of the transmit matrix A and the vector s is a vector x. This matrix multiplication step effectively weights each element of the vector s across each of the N antennas, thereby distributing the plurality of signals among the plurality of antennas for simultaneous transmission. Components $x_1$ through $x_N$ of the vector x resulting from the matrix multiplication block are then coupled to a corresponding antenna of the first communication device. For example, component $x_1$ is the sum of all of the weighted elements of the vector s for antenna 1, component $x_2$ is the sum of all of the weighted elements of the vector s for antenna 2, etc.

The transmit matrix A is a complex matrix comprised of transmit weights $w_{T,ij}$, for i=1 to L and j=1 to N. Each antenna weight may depend on frequency to account for a frequency-dependent channel H. For example, for a multi-carrier modulation system, such as an orthogonal frequency division multiplexed (OFDM) system, there is a matrix A for each sub-carrier frequency k. In other words, each transmit weight $w_{T,ij}$ is a function of sub-carrier frequency k.

Prior approaches involve selecting the weights $d_p$ to maximize capacity $$C = \sum_{p=1}^{L} \log(1 + SNR_p), \; SNR_p = |d_p|^2 \lambda_p \frac{E(|s_p|^2)}{E(|n_p|^2)}$$

subject to a total power constraint emitted by the plurality of transmit antennas combined on the transmit matrix A, i.e., $$P_{TOT} = Tr(AA^H) \cdot E|s_p|^2$$
$$= Tr(VDD^H V^H) \cdot E|s_p|^2$$
$$= Tr(VDD^H V^H) < P_{max} \text{ (assuming } E|s_p|^2 = 1\text{)}$$

The optimum solution to this problem is to use waterfilling to select the weights $d_p$ (i.e., use waterfilling to put more power in eigenchannels with higher SNR $\lambda_p$).

The waterfilling approach requires N full-power capable power amplifiers at the transmitting device since, for some channels, it is possible for the optimal solution to require all or nearly all the transmit power to be sent from one antenna path. To reiterate, the prior approaches constrain the total power emitted from all of the antenna paths combined, simply $\Sigma P_i = P_{TOT} < P_{max}$ (for i=1 to N antennas) where $P_{max}$ is a total power constraint and $P_i$ is the power from transmit antenna path i.

A better approach is to use a power constraint for each individual transmit antenna path. One such constraint is that the power transmitted from each antenna is less than the total power transmitted from all N antennas combined ($P_{max}$) divided by N, e.g., $P_i \leq P_{max}/N$ for all i. Using this approach, referred to as the "antenna power constraint" approach, each power amplifier can be designed to output (no more than) $P_{max}/N$ average power, where $P_{max}$ is the maximum power of the transmission from all of the N antennas combined. A significant benefit of this approach is that the power amplifiers can be designed to have lower maximum output power capability, thus requiring less silicon area. The use of smaller and lower-output power amplifiers has the benefit of lower on-chip power amplifier interference and lower DC current drain.

Using a $P_{max}/N$ power constraint for each antenna, the problem becomes:
Maximize capacity C subject to
$(AA^H)_{ii} < P_{max}/N$, i=1, . . . ,N.

This is a difficult problem to solve for $d_p$, since it involves finding the roots of a non-linear function using N Lagrange multipliers (one for each of the above N constraints). However, there is a simple non-optimal solution for each of two cases that are more fully described in the aforementioned U.S. application Ser. No. 10/627,537.

Figure 7:
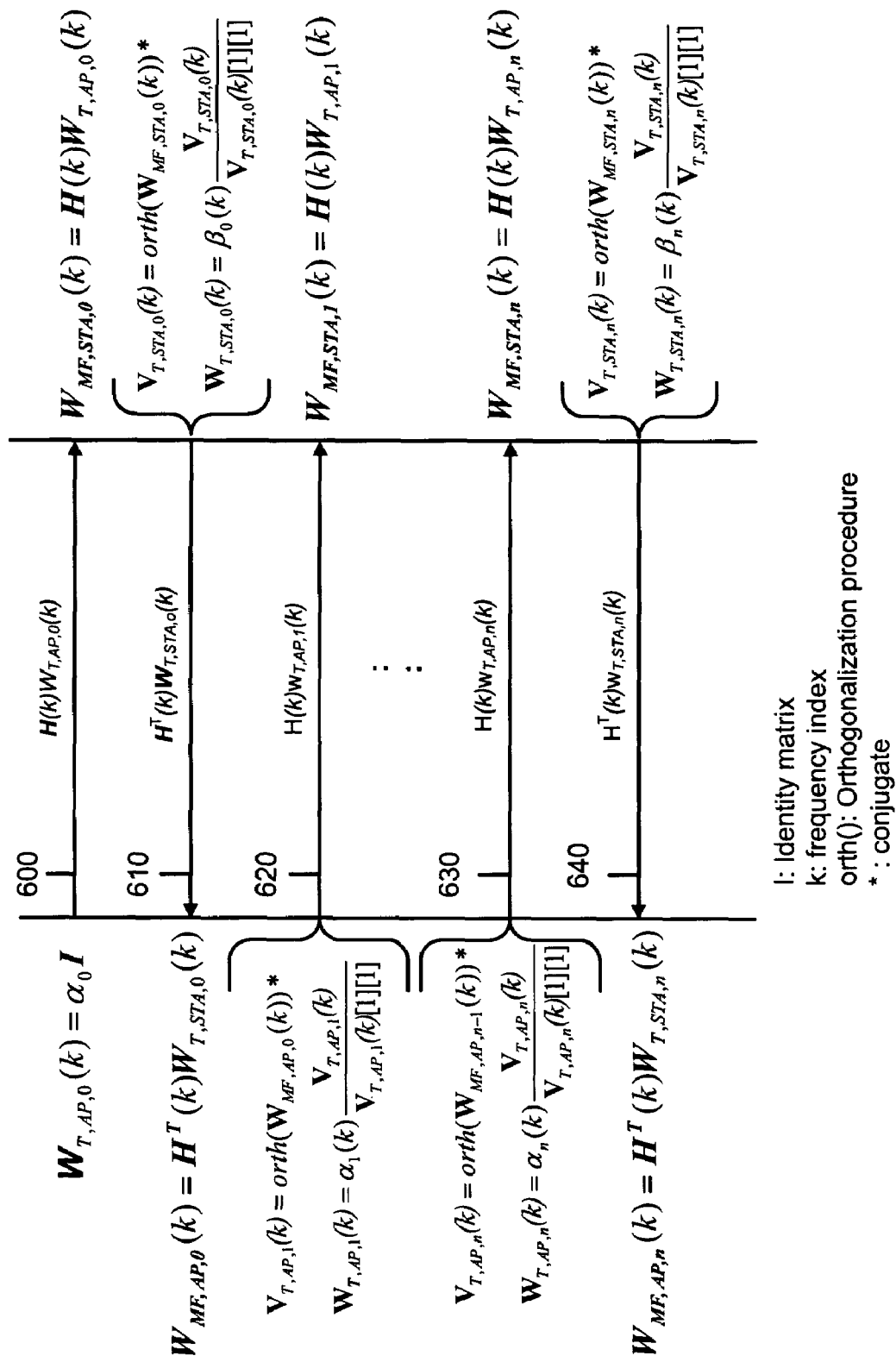
FIG. 7 is a flow chart of an adaptive algorithm used in a vector beamforming system that includes processing steps to compensate for group delay.

FIG. 7 shows a procedure useful to adaptively update the transmit antenna weights at one of the devices based on the receive weights. This procedure is more fully described in U.S. Provisional Application No. 60/511,530 and in U.S. application Ser. No. 10/779,268, filed on Feb. 13, 2004, and entitled "System And Method For Transmit Weight Computation For Vector Transmit Beamforming Radio Communication." FIG. 7 includes a modification to this adaptive procedure to compensate for group delay caused by a receive synchronization algorithm at the receive side of the link in OFDM systems.

In order to make the following mathematical expressions easier to follow, and only as an example, device 100 is a WLAN AP and device 200 is a WLAN STA. It should be understood that these techniques are applicable to any other wireless radio communication application. The following nomenclature is used.

N=# antennas at AP side of link.
M=# antennas at STA side of link.
H=complex MxN MIMO channel response from AP to STA.
$H^T$=complex NxM MIMO channel response from STA to AP.
L=# modes $\leq$ min(N, M).
$W_{T,AP}$, $W_{R,AP}$=Transmit and receive weight matrices, respectively, at AP side of link.
$W_{T,STA}$, $W_{R,STA}$=Transmit and receive weight matrices, respectively, at STA side of link.
$W_{T,AP}$ is written out and shown below; $W_{R,AP}$, $W_{T,STA}$ and $W_{R,STA}$ are similarly defined.
$P_{T,AP}$ and $P_{T,STA}$ are the total transmit powers at the AP and STA, respectively.

The algorithm is based on QR iterations which is a numerical technique to find the eigenvalues and eigenvectors of a Hermitian matrix. Initially, since the transmit weights are arbitrary, the SNR for each mode is assumed to be identical. The subscripts T,AP,0 in FIG. 7 indicate that it is a transmit matrix for the AP at iteration 0. Similarly, the subscripts T,STA,0 indicate that it is a transmit matrix for the STA at iteration 0. Furthermore, the scalars α and β are power constraint factors used for the transmit matrices to ensure that the transmitted signals (from the AP to the STA, in the case of the scalar a or STA to the AP in the case of the scalar β) satisfy an antenna power constraint for $D_{kk}^2$ and $S_{kk}^2$. This convention is used throughout FIG. 7. Each of the matrices may be dependent on a frequency sub-carrier k, and thus may be rewritten as, for example, A(k) s(k)=$W_T$(k) s(k).

In step 600, signals sent by the AP to the STA are received at the STA and the STA determines the receive weights by computing the matched filter coefficients for the matched filtered matrix $W_{MF,STA,0}$ from the received signals. In step 610, the STA computes an intermediate matrix $V_{T,STA,0}$(k) by computing the orthogonalization (hereinafter referred to as "orth( )") of the matched filtered matrix $W_{MF,STA,0}$ determined in step 600. The intermediate matrix may be computed as the conjugate of the orthogonalization of the matched filter matrix, as indicated in FIG. 7. The STA further determines the value of an element of the intermediate matrix $V_{T,STA,0}$(k) for one of the plurality of eigenmodes at one of the plurality of antennas. For example, the first eigenmode, designated eigenmode [1], is selected and the first antenna, designated antenna [1], is selected as a group delay normalization reference, represented by the expression $V_{T,STA,0}$(k)[1][1]. The transmit matrix $W_{T,STA,0}$ is computed by dividing the intermediate matrix $V_{T,STA,0}$(k) by, $V_{T,STA,0}$(k)[1][1], the value of the element of the intermediate matrix for this eigenmode and antenna, multiplied by a scalar $β_0$. In step 610, the transmit matrix $W_{T,STA,0}$ is applied to the plurality of modes for transmission signals to the STA.

A similar process is performed at the AP in step 620 for the plurality of modes transmitted by the STA to the AP. The AP will compute a matched filter matrix $W_{MF,AP,0}$ from signals received at its plurality of antennas. From the matched filter matrix, the AP computes an intermediate matrix $V_{T,AP,0}$(k) by computing the orthogonalization of the matched filtered matrix $W_{MF,AP,0}$. The AP further determines the value of an element of the intermediate matrix for one of the plurality of eigenmodes at one of the plurality of antennas, e.g., $V_{T,AP,0}$(k)[1][1]. The transmit matrix $W_{T,AP,1}$ is then computed by dividing the intermediate matrix $V_{T,AP,0}$(k) by $V_{T,AP,0}$(k)[1][1], multiplied by the scalar $α_1$. Normalizing the transmit matrix by a value of the transmit matrix for one of the eigenmodes at one of the plurality of antennas serves to compensate for any group delay caused by the receive synchronization algorithm at the receiving device.

This process repeats as indicated by steps 630 and 640 as signals are transmitted between the AP and the STA Any of the well known techniques, such as QR decomposition and Gram-Schmidt orthogonalization, may be used for the orthogonalization operation. After a few iterations, the transmit weights converge to the eigenvector corresponding to the maximum L eigenvalues (See, G. Golub, C. V. Loan, "Matrix Computations," $2^{nd}$ edition, p. 351.), and will adapt to changing conditions in the channel. The signal processing shown in FIG. 7 may be performed by the modems (baseband signal processor) of the respective communication devices on the link.

In the adaptive algorithm of FIG. 7, the transmit matrix may be computed subject to an antenna power constraint that requires that the power transmitted from each of the plurality of antennas of the first communication device is less than a maximum power, and optionally subject to a frequency shaping constraint that requires that the sum of the power at corresponding sub-carrier frequencies for each mode across the plurality of antenna paths is the same.

To summarize the adaptive algorithm for vector beamforming modified to compensate for group delay, the step of computing transmit weights comprises computing a transmit matrix from signals received at the plurality of antennas of the first communication device representing a plurality of modes simultaneously transmitted by the second communication device, wherein each mode is a signal stream, wherein the transmit matrix distributes a plurality of modes among a plurality of antenna paths associated with corresponding ones of the plurality of antennas of the first communication device. The step of applying comprises applying the transmit matrix to a plurality of modes to be simultaneously transmitted from the first communication device to the second communication device. The transmit matrix is processed to compensate for group delay by normalizing the transmit matrix with respect to an element of the transmit matrix corresponding to one of the plurality of modes at one of the plurality of antennas. Said another way, the step of computing the transmit weights comprises computing an intermediate matrix from signals received at the plurality of antennas of the first communication device representing a plurality of modes simultaneously transmitted by the second communication device, wherein each mode is a signal stream. The intermediate matrix is further processed to compensate for group delay by dividing it by an element of the intermediate matrix corresponding to one of the plurality of modes at one of the plurality of antennas thereby producing a transmit matrix that distributes a plurality of modes among a plurality of antenna paths associated with corresponding ones of the plurality of antennas of the first communication device. The transmit matrix may be computed such that the power transmitted from each of the plurality of antennas of the first communication device is less than a maximum power. Moreover, the transmit matrix may be computed such that the sum of the power at corresponding sub-carrier frequencies for each mode across the plurality of antenna paths is the same. These techniques are performed at the devices on both sides of the link whereby each time a first device receives signals from the second device it updates the transmit matrix it uses when transmitting back to the second device, and vice versa.

Figure 8:
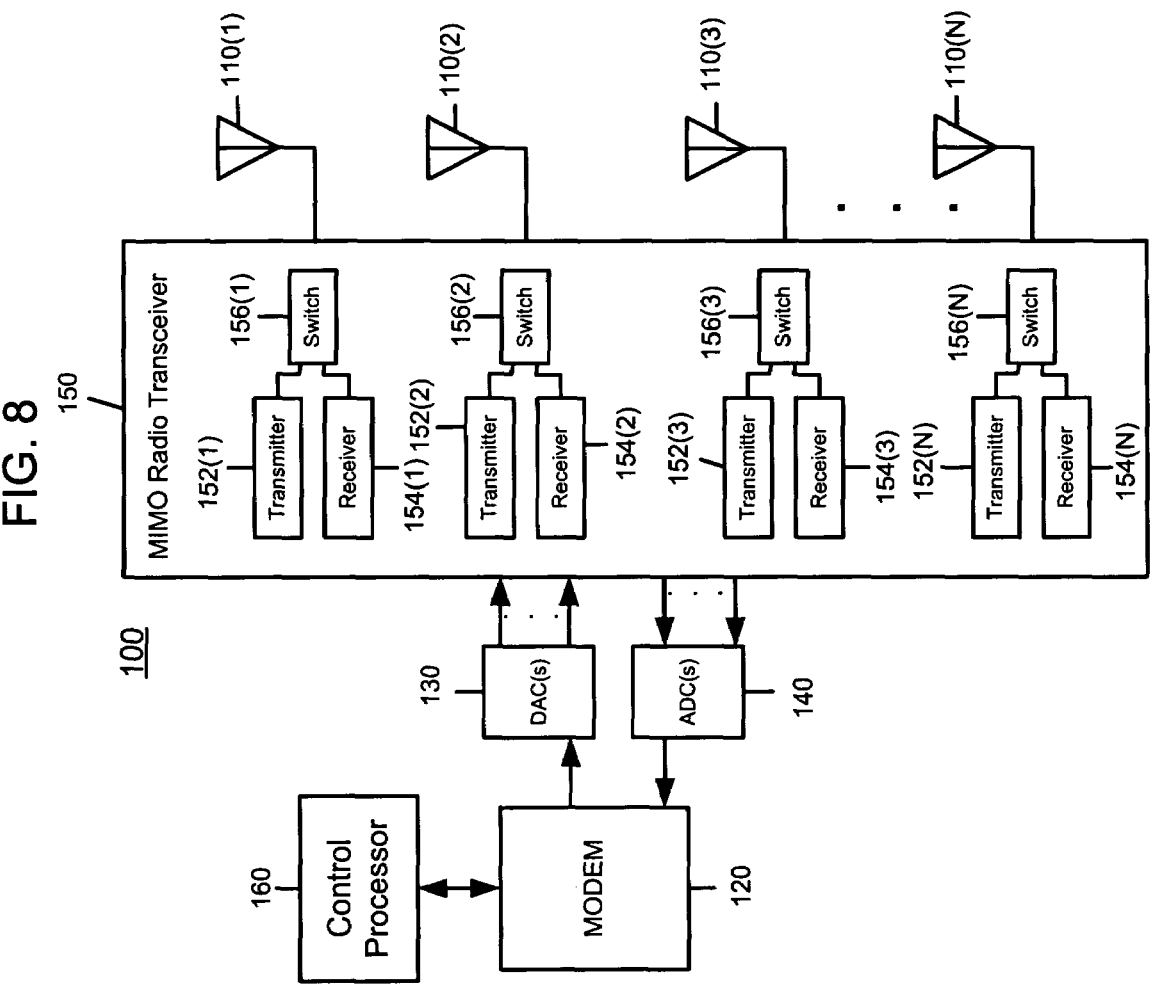
FIG. 8 is a block diagram of a radio communication device in which the techniques described herein may be employed.

FIG. 8 shows a block diagram of a radio communication device suitable for devices 100 and 200 in a beamforming system (FIG. 5) or vector beamforming system (FIG. 7). For example, device 100 comprises a modem 120, a plurality of digital-to-analog converters (DACs) 130, a plurality of analog-to-digital converters (ADCs) 140, a MIMO radio transceiver 150 coupled to antennas 110(1) to 110(N) and a control processor 160. The modem 120, also referred to as a baseband signal processor, performs the baseband modulation of signals to be transmitted (e.g., signal s or vector s) and the baseband demodulation of received signals. In so doing, the modem 120 multiplies the signal s (or vector s representing the L modes $[s_1 \ldots s_L]^T$) to be transmitted by a transmit weight vector, or in the case of a vector s, by a transmit matrix A. The DACs 130 are complex DACs that convert the digital baseband modulated signals representing modulated baseband transmit signals to corresponding analog signals that are coupled to transmit paths in the MIMO radio transceiver 150. The ADCs 140 convert the received analog signals from corresponding receive paths in the MIMO radio transceiver 150 to digital signals for baseband demodulation by the modem 120. In the baseband demodulation process, the modem 120 will apply appropriate receive weights to the received signals to recover the signal s, or in the case of a vector system, the vector s representing the L modes $[s_1 \ldots s_L]^T$. The MIMO radio transceiver 150 comprises a plurality of radio transceivers each comprising a transmitter 152(i) and a receiver 154(i) associated with and coupled to a corresponding antenna by a corresponding switch 156(i). Each transmitter includes a power amplifier (not shown). The MIMO radio transceiver 150 may be a single integrated circuit or two or more separate integrated circuits. An example of a fully-integrated MIMO radio transceiver is disclosed in co-pending and commonly assigned U.S. patent application Ser. No. 10/065,388, filed Oct. 11, 2002, the entirety of which is incorporated herein by reference.

When the group delay compensation techniques described above are employed in a radio communication device, the radio communication may comprise a plurality of antennas; a radio transceiver coupled to the plurality of antennas, the radio transceiver capable of upconverting a plurality of transmit signals for simultaneous transmission via the plurality of antennas, and downconverting a plurality of signals simultaneously received at the plurality of antennas to produce a plurality of received signals; and a baseband signal processor coupled to the radio transceiver that computes transmit weights from signals transmitted by another communication device and received at a plurality of antennas, processes the transmit weights to compensate for group delay that may be introduced by receive synchronization performed by the baseband signal processor, and applies the transmit weights to a transmit signal to produce a plurality of transmit signals to be simultaneously transmitted from corresponding ones of the plurality of antennas to the other communication device.

These techniques may also be embodied on a medium, such as processor or computer readable medium (included in the control processor shown in FIG. 8), that when executed, cause the processor to perform steps of: computing transmit weights from signals transmitted by a second communication device and received at a plurality of antennas of a first communication device, wherein the step of computing comprises processing the transmit weights to compensate for group delay that may be introduced by receive synchronization performed by the first communication device; and applying the transmit weights to a transmit signal to produce a plurality of transmit signals to be simultaneously transmitted from corresponding ones of the plurality of antennas of the first communication device to the second communication device. Alternatively, the medium may be a semiconductor on which a plurality of digital logics gates are deployed and configured to perform these and other steps described herein (perhaps as part of the modem 120 shown in FIG. 8). For example, the semiconductor may be an application specific integrated circuit that is the baseband signal processor or modem. These instructions may also be implemented by a field programmable gate array.

Furthermore, these techniques may be employed at both ends of a communication link where a method is provided for communication between a first communication device and a second communication device using radio frequency (RF) communication techniques. At the first communication device, the steps performed are: computing transmit weights from signals transmitted by the second communication device and received at a plurality of antennas of the first communication device, wherein the step of computing comprises processing the transmit weights to compensate for group delay that may be introduced by receive synchronization performed by the first communication device; and applying the transmit weights to a transmit signal to produce a plurality of transmit signals to be simultaneously transmitted from corresponding ones of the plurality of antennas of the first communication device to the second communication device. At the second communication device, the steps performed are: computing transmit weights from signals transmitted by the first communication device and received at a plurality of antennas of the second communication device, wherein the step of computing comprises processing the transmit weights to compensate for group delay that may be introduced by receive synchronization performed by the second communication device; and applying the transmit weights to a transmit signal to produce a plurality of transmit signals to be simultaneously transmitted from corresponding ones of the plurality of antennas of the second communication device to the first communication device. The step of computing is performed at each communication device when signals are received from the other communication device to update their transmit weights.

The above description is intended by way of example only.

What is claimed is:

1. A method for wireless communication between a first communication device and a second communication device, comprising steps of:
   computing a transmit matrix of antenna weights from signals received at the plurality of antennas of the first communication device representing a plurality of modes simultaneously transmitted by the second communication device, wherein the transmit matrix distributes a plurality of modes among a plurality of antenna paths associated with corresponding ones of the plurality of antennas of the first communication device;
   processing the transmit matrix to compensate for group delay that may be introduced by receive synchronization performed by the first communication device, said processing including normalizing the transmit matrix with respect to a reference mode corresponding to one of the plurality of antennas of the first communication device; and
   applying the transmit matrix to a plurality of modes to be simultaneously transmitted from corresponding ones of the plurality of antennas of the first communication device to the second communication device.

2. The method of claim 1, and further comprising:
   computing a matched filter matrix of matched filter coefficients from the signals received at the plurality of antennas of the first communication device; and
   computing an intermediate matrix as the orthogonalization of the conjugate of the matched filter matrix.

3. The method of claim 2, wherein the orthogonalization is a Gram-Schmidt orthogonalization.

4. The method of claim 2, wherein a QR decomposition is used for the orthogonalization.

5. The method of claim 2, wherein the normalizing the transmit matrix is computed by dividing the intermediate matrix by the value of the element of the intermediate matrix for the reference mode.

6. The method of claim 1, further comprising:
   computing a transmit matrix of antenna weights from signals received at the plurality of antennas of the second communication device representing a plurality of modes simultaneously transmitted by the first communication device, wherein the transmit matrix distributes a plurality of modes among a plurality of antenna paths associated with corresponding ones of the plurality of antennas of the second communication device;

processing the transmit matrix to compensate for group delay that may be introduced by receive synchronization performed by the second communication device, said processing including normalizing the transmit matrix with respect to a reference mode corresponding to one of the plurality of antennas of the second communication device; and applying the transmit matrix to a plurality of modes to be simultaneously transmitted from corresponding ones of the plurality of antennas of the second communication device to the first communication device.

7. The method of claim 6 further comprising an iterative repeating the exchange of simultaneous modes and computing of the transmit matrix by the first and second communication devices until the antenna weights converge.

8. The method of claim 6 further comprising an iterative repeating the exchange of simultaneous modes and computing of the transmit matrix by the first and second communication devices for adaptive response to changing conditions in the channel.

9. The method of claim 1, wherein the computing the transmit matrix is performed such that the power transmitted from each of the plurality of antennas of the first communication device is less than a total power transmitted from all N antennas combined divided by N.

10. The method of claim 9, wherein the computing the transmit matrix is performed such that the sum of the power at corresponding sub-carrier frequencies for each mode across the plurality of antenna paths is the same.

11. A MIMO radio communication device comprising:
a. a plurality of antennas;
b. a radio transceiver coupled to the plurality of antennas, the radio transceiver capable of upconverting a plurality of transmit signals for simultaneous transmission via the plurality of antennas, and downconverting a plurality of signals simultaneously received at the plurality of antennas to produce a plurality of received signals; and
c. a baseband signal processor coupled to the radio transceiver that computes a transmit matrix of antenna weights from a plurality of modes simultaneously transmitted by another communication device and received at the plurality of antennas, wherein the transmit matrix distributes a plurality of modes among a plurality of antenna paths associated with corresponding ones of the plurality of antennas; processes the transmit matrix to compensate for a group delay by normalizing the transmit matrix with respect to a reference mode corresponding to one of the plurality of antennas, said group delay introduced by receive synchronization at the radio communication device; and applies the transmit matrix to a plurality of modes to be simultaneously transmitted from corresponding ones of the plurality of antennas.

12. The communication device of claim 11, wherein the baseband signal processor computes a matched filter matrix of matched filter coefficients from the signals received at the plurality of antennas of the first communication device; and computes an intermediate matrix as the orthogonalization of the conjugate of the matched filter matrix.

13. The communication device of claim 12, wherein the baseband signal processor computes the orthogonalization using Gram-Schmidt orthogonalization.

14. The communication device of claim 12, wherein the baseband signal processor computes the orthogonalization using a QR decomposition.

15. The communication device of claim 12, wherein the normalizing the transmit matrix is computed by dividing the intermediate matrix by the value of the element of the intermediate matrix for the reference mode.

16. The communication device of claim 11, wherein the baseband signal processor computes the transmit matrix such that the power transmitted from each of the plurality of antennas of the first communication device is less than a total power transmitted from all N antennas combined divided by N.

17. The communication device of claim 11, wherein the baseband signal processor computes the transmit matrix such that the sum of the power at corresponding sub-carrier frequencies for each mode across the plurality of antenna paths is the same.

* * * * *

UNITED STATES PATENT AND TRADEMARK OFFICE
CERTIFICATE OF CORRECTION

PATENT NO. : 7,308,287 B2
APPLICATION NO. : 11/487242
DATED : December 11, 2007
INVENTOR(S) : Chandra Vaidyanathan It is certified that error appears in the above-identified patent and that said Letters Patent is hereby corrected as shown below:

ON THE TITLE PAGE:

At item (56), U.S. PATENT DOCUMENTS, page 2, left column, line 52, delete the line beginning with "2002/0001316" and insert therefor
--2002/0001316  A1  1/2002  Hornsby et al--.

At item (56), OTHER PUBLICATIONS, page 2, right column, line 23, before the words "et al.", "The Role", delete "Valdyanathan" and insert therefor
--Vaidyanathan--.

At item (56), OTHER PUBLICATIONS, page 2, right column, line 38, after the word "Technologies", delete "Builder" and insert therefor --Boulder--.

At item (56), OTHER PUBLICATIONS, page 3, left column, line 13, before the words "Michel et al.,", delete "Ivriac" and insert therefor --Ivrlac--.

At column 2, line 9, after the words "a device", insert --which--.

At column 2, line 31, before the words "in which", delete "is shown".

At column 3, line 6, after the words "such that", delete "wtx" and insert therefor --$w_{tx}$--.

At column 3, line 60, before the word "upconverted", delete "$w_{TAP,0}(k)$" and insert therefor --$w_{T,AP,0}(k)$--.

UNITED STATES PATENT AND TRADEMARK OFFICE
CERTIFICATE OF CORRECTION

PATENT NO. : 7,308,287 B2
APPLICATION NO. : 11/487242
DATED : December 11, 2007
INVENTOR(S) : Chandra Vaidyanathan It is certified that error appears in the above-identified patent and that said Letters Patent is hereby corrected as shown below:

At column 4, line 65, before the words "group delay", delete "T" and insert therefor --This--.

At column 5, line 39, after the word "vector", delete "$w_{TSTA,0}(k)$" and insert therefor --$w_{T,STA,0}(k)$--.

At column 5, line 57, before the word "signals", delete "receive" and insert therefor --receives--.

At column 9, line 5, after the word "scalar", delete "a" and insert therefor --α--.

Signed and Sealed this

Thirteenth Day of May, 2008

JON W. DUDAS
*Director of the United States Patent and Trademark Office*